April 27, 1965

S. ARMSTRONG 3,180,211

MEANS FOR PROVIDING AN OPTICAL THIRD
DIMENSION IN MOTION PICTURES

Filed Feb. 15, 1960

INVENTOR.
SAMUEL ARMSTRONG
BY C. F. Stratton
ATTORNEY

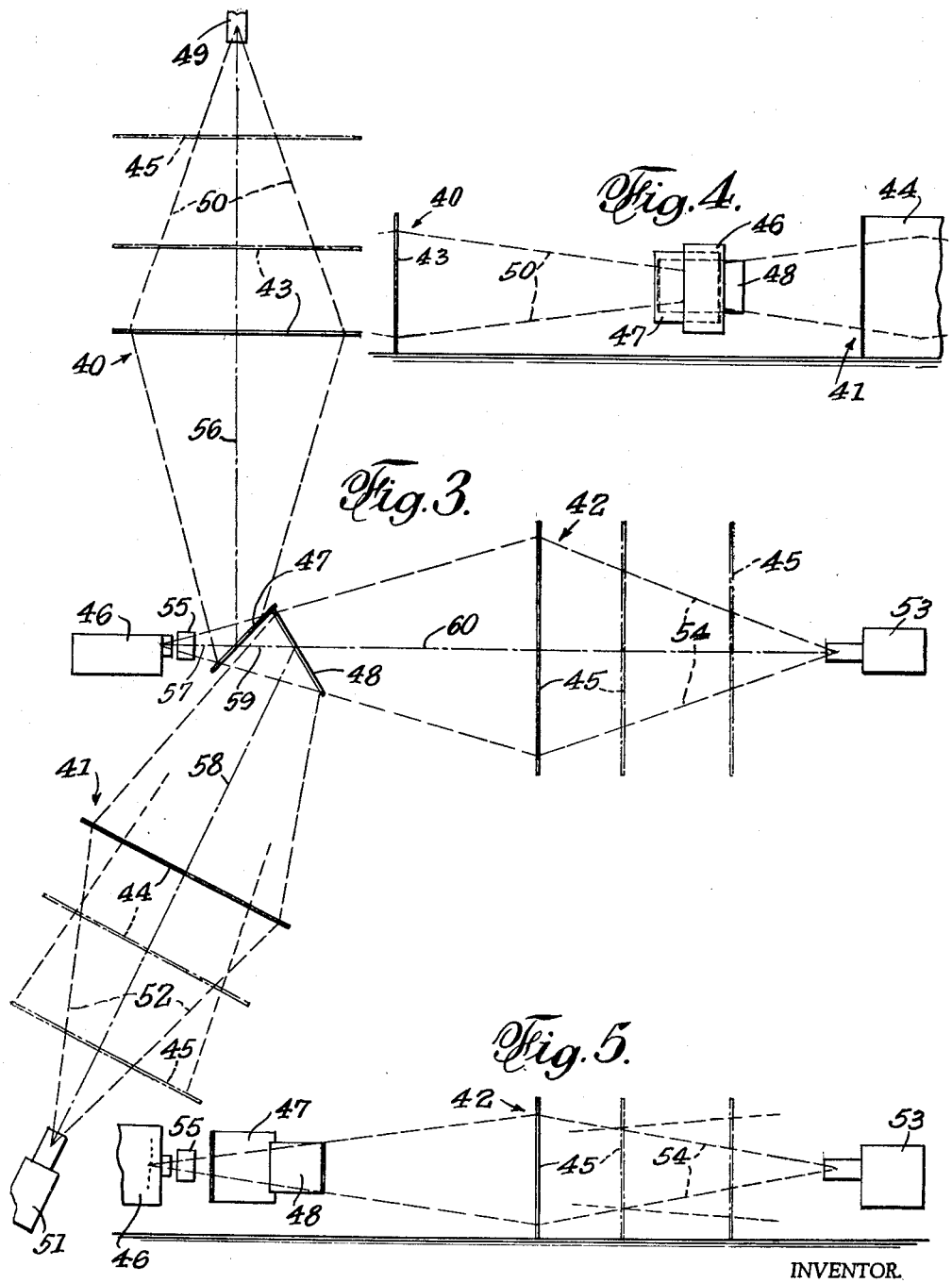

United States Patent Office 3,180,211
Patented Apr. 27, 1965

3,180,211
MEANS FOR PROVIDING AN OPTICAL THIRD DIMENSION IN MOTION PICTURES
Samuel Armstrong, 7658 Corbin Ave., Reseda, Calif.
Filed Feb. 15, 1960, Ser. No. 8,743
2 Claims. (Cl. 88—24)

This invention relates to a method and means for providing an optical third dimension in motion pictures.

The invention has two primary objectives, one, to provide a process and means that is incorporated and used in a theatre or similar auditorium and which, by the superposition of different picture images of actors, sets, backgrounds, etc., provides a viewer with a composite picture that gives the illusion of such depth that the viewer has the illusion of being in the locale of the scene being viewed, and the other, to provide a process and means for photographing motion pictures on a wide-screen film that may be displayed in an ordinary motion picture theatre and which combines photographic images having the illusions to the viewer mentioned above. The latter means embodies a prime focus process and both said processes have the common characteristic of a road show quality film at extremely low cost, particularly in the reduction or elimination of costly settings, big cameras, lighting costs, and other techniques and paraphernalia attending present motion picture production.

Whether on a single wide screen film or on two or more separate films for simultaneous projection, the present method and means have the objective of presenting to the viewer a moving scene of such depth perception that the dramatis personae, in varying degrees of depth, are displayed to the viewer in spaced relation to the background in which the action takes place.

My invention also has for its objects to provide a novel, economical and convenient method or process of superior utility, and to provide apparatus that is positive in operation, convenient in use, easily installed in working position and easily disconnected therefrom, economical of manufacture, relatively simple, and of general superiority and serviceability.

The invention also contemplates novel combinations of method steps as well as of novel details of construction and novel combinations and arrangements of parts, which will appear more fully in the course of the following description, which is based on the accompanying drawings. However, said drawings merely show and the following description merely describes, the invention with respect to a preferred method and apparatus, the same, nevertheless, being given by way of illustration or example only.

In the drawings, like reference characters designate similar parts in the several views.

FIG. 3 is a schematic plan view of a prime focus process system for producing a single film embodying features of the present invention.

FIG. 4 is a partial side elevational view as seen from the left of FIG. 3.

FIG. 5 is an elevational view as seen from the lower end of FIG. 3.

Figure 1:
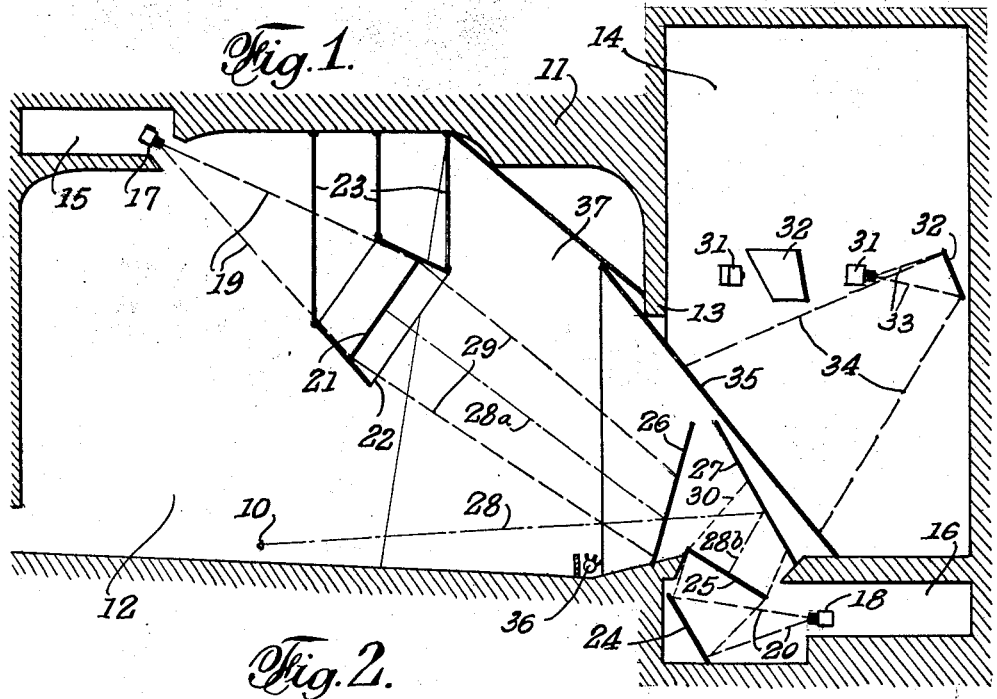
FIG. 1 is a longitudinal sectional view of a theatre showing means for the simultaneous presentation to the viewer of previously made motion picture films of the dramatis personae and prepared still background films.
Figure 2:
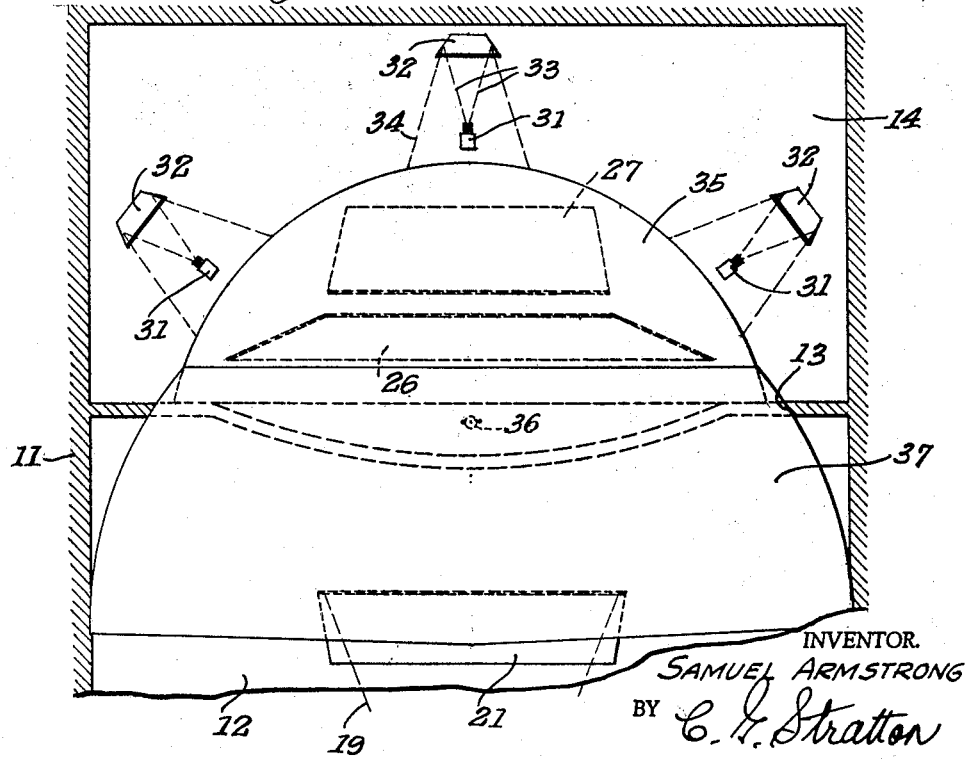
FIG. 2 is a plan sectional view of the means shown in FIG. 1.

With particular reference to the form of the means shown in FIGS. 1 and 2, the method or process used entails the production of two separate films for each dramatic action, one with the principal actors or characters in the foreground and the other with the supporting actors or characters in the background. Both these films are taken against an unlighted black background and the same, in addition to the actors, may picture props incidental to the scene and having a foreground or more remote position. These films are preferably wide screen films regardless which of the various such film processes are adopted. Therefore, the present process includes the provision of so-called foreground and background films each separately photographed before a light-absorbing background which photographs black on said films.

The present method also entails the provision of one or more set or background pictures made independently of the above mentioned films and adapted for still projection such as stereopticon type projection.

A third image means is provided for showing various sky effects. Such means may comprise photographed images of clouds, stars, etc.

The above films of dramatis personae, and pictures of background and of sky are, according to the present invention, simultaneously projected in superimposition to produce the optical effects above stated. The means for providing a viewer 10 in a theatre 11 with the optical or visual effects of such projection is shown in FIGS. 1 and 2.

The theatre 11 has the usual auditorium 12 in which the viewer is seated, a proscenium arch 13 separating said auditorium from the stage area 14, and, in the present case, a projection booth 15 at the rear of the auditorium and elevated above the floor thereof, and a projection booth 16 beneath the stage rearward of the proscenium arch.

The means of the present invention comprises a projector 17 in the booth 15 and directing its beam downwardly toward the stage, and a projector 18 in the booth 16 and directing its beam substantially horizontally but oppositely to the beam of the projector 17. Projector 17 is threaded with the film that pictures the action of the principal actors in the form of a beam 19 that is here called a principal action beam, and the projector 18 is threaded with the film that pictures the action of the supporting actors in the form of a supporting action beam 20.

The image of the beam 19 is directed onto a translucent screen 21 that is shown as enclosed in a hood 22 suspended, as by rods 23, from the auditorium ceiling. Said screen and hood are disposed considerably above the heads of the audience on the auditorium floor, as represented by the viewer 10. Said screen 21 is disposed normal to the direction of the beam 19. Thus, the image projected on the translucent screen 21 is visible from the side toward the stage, the same being shielded from extraneous light and reflections by the hood 22.

The image of the beam 20 is directed onto a full mirror 24 and is reflected by said mirror onto a translucent screen 25. Thus, the upper face of screen 25 has an image thereon that is projected by projector 18, the same being visible from above.

The images of screens 21 and 25 are reflected to the viewer 10 by means of respective partial mirrors 26 and 27 and the combined images impinged on said mirrors are directed along a line of sight 28 to the observer. Said line of sight extends along the line 28a between the screen 21 and the partial mirror 26 and along the line 28b between the screen 25 and the partial mirror 27. Thus, the viewer sees on the partial mirrors 26 and 27 the reflected beam 29 and the reflected beam 30.

From the third paragraph above, it will be seen that the line-action image projected from the rear by beam 19 onto the translucent screen 21 provides a strong image, as regards tone and color, visible from the side of the stage, i.e., from the side away from the projector where the beam 19 originates. Said beam 19 goes no further, but the partial mirror reflects the image on screen 21 to the observer 10.

In practice, the lighting of the action on the film in projector 17 is materially more intense than the lighting of the action on the film in projector 18. As a consequence, although the viewer 10 is actually looking at two different images, one, as directly reflected by partial mirror 26 and the other as reflected by partial mirror 27 through the mirror 26, and sees the two images superimposed on each other, the image on the mirror 26 overrides the image on mirror 27 and is optically brought to the foreground. Therefore, the lighting of the action on mirror 26 covers over such of the action on mirror 27 directly in line, permitting the viewer 10 to see all of the front or foreground action and only such of the background action that is not covered by the lighting on the foreground action.

The present means includes one or more still projectors 31, three being shown, that project still background scenes onto a mirror 32 on a beam 33, the image of said beam in said mirror then being reflected from the rear of the stage area 14 toward the opening in the proscenium arch 13. This reflected beam 34 impinges on a translucent shell-like screen 35 that has its concave side facing the auditorium and is rearward of the partial mirrors 26 and 27. Said mirrors, as can be seen, are surrounded, sides and rear by the screen 35 in a half circle arrangement. It will be evident, therefore, that the images of the three still projectors 31 are visible to the viewer 10 because the same appear through the screen 35.

Screen 35, in part, extends above and laterally of the mirrors 26 and 27 and the images on such elevated and lateral portions are readily seen by the viewer. Because of the partial transparency of the mirrors 26 and 27, image portions on screen 35 rearward of said mirrors are rendered visible to the viewer 10 except where the lighting of beams 29 and 30 intercept and, therefore, blot out the background image.

It will be recalled that the action pictures are taken before a light-absorbing or black background. Now, if the actors in such pictures are photographed in intense light substantially stronger than the lighting used on the background pictures the visual effect on the observer is a strongly illuminated foreground action, a less strongly illuminated background action, and a weakly illuminated still background, all of which are optically superimposed, yet visually separated for the reasons above given.

The above-described means may be supplemented by projection on the screen 35 of sky effects or images, in which case a planetarium type universal projector 36 may be placed stage center to project starry sky and cloud images on the upper portion of the translucent shell screen 35. Such projectors are not, per se, part of this invention but may be employed, in the manner of sky scene projection in planetariums, to impinge a desired sky picture on screen 35, with sky, clouds and/or for foliage as the scene may require.

Of course, the projector 36 may be omitted and its function included in the projectors 31. It will be realized that use of a separate sky image projector enables extension of the picture seeen by the viewer over a more elevated area of screen 35 than may be reached by the beams 34.

Also, the illusion of greater depth to the picture seen by the viewer 10 may be produced by use of a supplemental forward extension 37 of the screen 35. Said extension 37 is formed as an arch-shaped screen that may be independently illuminated by picture scenes projected from still projectors carried by the hood 22. Such an auxiliary screen 37 serves to enlargen the scene or locale of the picture that is being viewed to bring the illusion to the viewer of being within the area of the scene.

The partial mirrors 26 and 27 are preferably made so as to reflect 40% of the light of beams 29 and 30 to the viewer. Thus, said mirrors are 60% transparent and can be seen through except where the reflected images of said beams are impinged. Since the image of mirror 27 is rearward of the image of mirror 26, and the images on screen 35 are rearward of both, the illusion of depth is strong and the feeling of a third or depth dimension in the picture is quite pronounced.

The foregoing describes the use of film elements that are used in projectors 17, 18, 31 and 36 and the manner in which the same are optically synchronized or coordinated in a motion picture theatre. The means shown in FIGS. 3, 4 and 5 embodies a prime focus system by means of which the production or film elements of the separate films originally described are combined on a single wide screen film for regular release to ordinary single screen theatres for viewing by an audience. The present prime focus system has the important advantage over multi-screen systems in that three objectives or picture elements of a given scene may be rephotographed simultaneously in proper focus and without the need for stopping down the lens diaphragm or aperture, thus providing a composite on a single wide screen film that is suitable for presentations in single-screen theatres.

As seen in the plan view of FIG. 3, the present prime focus system consists, generally, of three parts 40, 41 and 42, each a segment of a tri-optical system, which provides projected images on three separate translucent screens, respectively 43, 44 and 45, the images on said screens being seen by a single camera 46 and photographed in a single wide screen film in said camera through two partial mirrors 47 and 48 that reflect and transmit much like the mirrors 26 and 27 previously described.

The optical part 40 comprises a motion picture projector 49 that is provided with live action color film and which projects the same along a beam 50 onto the translucent screen 43. The image on the screen 43 is seen by the mirror 47 which, as previously indicated, reflects 40% of the light impinged thereon to the film in camera 46. The remaining 60% of the light is transmitted by said partial mirror 47. Similarly, the optical part 41 comprises a motion picture projector 51 that is provided with stills or motion pictures according to the requirements of the scene and which projects the same along a beam 52 onto the translucent screen 44. The image on this screen is seen by the translucent mirror 48 which, in the 40%:60% proportion indicated, reflects the light impinged thereon to the film in camera 46, the same pasing through the mirror 47 because the latter is 60% transparent. The optical part 42 has a projector 53 that is primarily used to project the still images of background elements and effects along a beam 54, through both mirrors 48 and 47, in that order, to the film in camera 46.

Thus, the single camera 46, preferably provided with an anamorphic lens component 55, is simultaneously exposed to and photographs the thre images on the screens 43, 44 and 45, thereby, producing a composite re-photograph of the three films and/or stills in the projectors 49, 51 and 53.

Since there are three objectives—the three images on the screens—in the present system, prime focus is a basic requirement of the system in order that the composite picture be wholly in focus. Each screen 43, 44 and 45 is placed at the point of prime focus so that the line of sight from each said screen to the camera is exactly the same as that of the other lines of sight. Thus, line 56, between screen 43 and mirror 47, plus line 57 between said miror and the film in camera 46, is equal in length to the line 58, between screen 44 and mirror 48, plus line 59 between the latter mirror and the film, and is equal in length to the line 60, between screen 45 and the film.

Regardless of changes in location of any of the projectors 49, 51 and 53, the screens 43, 44 and 45 are always located at the described equal optical distances from the camera. If one screen is moved, the others must be similarly adjusted so the images thereon are in exact focus without the need for stopping down the diaphragm of the lens of the camera.

As shown by the alternate positions of the screens, the prime focus locations thereof will vary according to different basic lens systems that may be used. The drawings suggsets alternative screen positions for 50 mm. and for "Cinemascope" lenses.

It is preferred that one "stop motion" motion picture projector, the projector 49, be used for live dramatic action and that the action on the film used therein be photographed against an unlighted or black background, as before described; and that the other two projectors, the projectors 51 and 53, provide background elements, settings and effects, the images of which must pass through at least one of the transparent or partial mirrors. Thus, the lighting on the image from screen 43 overrides the background lighting since said image is directly reflected to the camera.

The similarity of the form of FIGS. 3, 4 and 5 to the form of FIGS. 1 and 2 is believed to be clear. The observer or viewer 10 and the camera 46 are alike in that both see what is reflected by the mirrors 26 and 27, in the one case, and the mirrors 47 and 48, in the other; the mirrors, in each case having the same relationship to each other, to the observer (viewer 10 or camera 46), and to the respective screens that direct images thereto and therethrough; and in each case, pre-produced films are projected onto the screens to be seen by the observer.

While I have illustrated and described what I now contemplate to be the best mode of carrying out my invention with respect to both the method and apparatus, the same, is, of course, subject to modification without departing from the spirit and scope of my invention. Therefore, I do not wish to restrict myself to the particular method steps or combination or sequence of steps described nor to the particular forms of construction illustrated and described, but desire to avail myself of all equivalents or modifications of method and apparatus that may fall within the scope of the appended claims.

Having thus described my invention, what I claim and desire to secure by Letters Patent is:

1. Means for producing a composite light image and transmitting the same to an observer in an auditorium facing the stage thereof, comprising:
   (a) a first translucent screen disposed above the floor of the auditorium,
   (b) means to project a light image onto said first screen and said screen being disposed to direct said image in a downward direction toward a first partial mirror,
   (c) said first partial mirror disposed above the stage floor and in the line of vision of the observer and disposed to be receptive of the image of the first screen to partly reflect said first image directly to the observer and partly pass the same therethrough,
   (d) a second translucent screen below the stage floor and line of sight of the observer and disposed behind and spaced from the first partial mirror,
   (e) means to project a light image onto said second screen, and
   (f) a second partial mirror disposed in the line of sight of the observer but behind the first mirror, said second partial mirror being disposed to be receptive of the image of the second screen to partly pass the image of the second screen therethrough and partly reflect the same to the observer through the first partial mirror and into coincidence with the reflection of the first mirror.

2. Means according to claim 1 in which the two transparent mirrors are arranged in relation to the observer and to each other to pass the transmitted portions of the images directed thereon by the mentioned screens in a direction away from the observer and in directions away from each other.

References Cited in the file of this patent

UNITED STATES PATENTS

| | | |
|---|---|---|
| 1,448,153 | Schneider | Mar. 13, 1923 |
| 1,636,834 | Peters et al. | July 26, 1927 |
| 2,336,508 | Smith et al. | Dec. 14, 1943 |
| 2,380,837 | Gray | July 31, 1945 |
| 2,727,429 | Jenkins | Dec. 20, 1955 |
| 2,857,806 | Shuftan | Oct. 28, 1958 |
| 2,952,182 | Marks et al. | Sept. 13, 1960 |

FOREIGN PATENTS

| | | |
|---|---|---|
| 16,326 | Great Britain | of 1894 |
| 186,898 | Great Britain | Mar. 15, 1923 |
| 435,151 | Great Britain | Sept. 16, 1935 |